United States Patent [19]

Carroll

[11] Patent Number: 5,391,228

[45] Date of Patent: * Feb. 21, 1995

[54] METHOD FOR PREPARING HIGH SOLIDS BENTONITE SLURRIES

[75] Inventor: Paul W. Carroll, Gonzales, Tex.

[73] Assignee: Southern Clay Products, Inc., Gonzales, Tex.

[*] Notice: The portion of the term of this patent subsequent to Nov. 30, 2010 has been disclaimed.

[21] Appl. No.: 877,836

[22] Filed: May 1, 1992

Related U.S. Application Data

[63] Continuation-in-part of Ser. No. 631,919, Dec. 21, 1990, Pat. No. 5,266,538.

[51] Int. Cl.⁶ .............................................. C04B 33/02
[52] U.S. Cl. ........................................ 106/486; 106/416; 106/DIG. 4; 501/146; 501/147; 501/145
[58] Field of Search ........................ 501/145, 146, 147; 106/DIG. 4, 416, 486

[56] References Cited

U.S. PATENT DOCUMENTS

| | | | |
|---|---|---|---|
| 3,371,988 | 3/1968 | Maynard et al. | 501/146 |
| 3,509,066 | 4/1970 | Jacobs et al. | 501/147 |
| 3,846,147 | 11/1974 | Tapper | 501/147 |
| 3,865,240 | 2/1975 | Schick | 106/DIG. 4 |
| 4,053,324 | 11/1977 | Haden, Jr. et al. | 427/146 |
| 4,131,476 | 12/1978 | Melcher et al. | 106/38.5 |
| 4,202,413 | 5/1980 | Messenger | 166/DIG. 1 |
| 4,267,062 | 5/1981 | Byerley | 252/8.55 R |
| 4,305,781 | 12/1981 | Langley et al. | 162/164 R |
| 4,359,339 | 11/1982 | Van Fisk, Jr. | 501/127 |
| 4,569,923 | 2/1986 | Knudson et al. | 501/148 |
| 4,624,982 | 11/1986 | Alexander | 524/446 |
| 4,631,091 | 12/1986 | Goodman | 501/145 |
| 4,742,098 | 5/1988 | Finlayson et al. | 523/514 |
| 4,836,946 | 6/1989 | Dixit | 252/97 |
| 5,223,098 | 6/1993 | Cluyse et al. | 162/181.2 |

*Primary Examiner*—Mark L. Bell
*Assistant Examiner*—Michael Marcheschi
*Attorney, Agent, or Firm*—Klauber & Jackson

[57] ABSTRACT

A method for preparing a time-stable, low viscosity, pumpable high solids aqueous bentonite slurry which has good application properties upon dilution and use. An aqueous solution of at least first and second salt components is prepared in which there is dispersed at least 8% by weight of the resultant slurry of a powdered bentonite. The first salt component is selected to give if used alone an acceptably low viscosity to the slurry at said high solids and at least good application properties upon the dilution and use. The second salt component is selected to act in combination with the first salt component to substantially further decrease the acceptably low viscosity at a specified high solids content or to enable increase of the solids content while maintaining the acceptably low viscosity, while not substantially impairing the application properties. The high solids pumpable slurry product is also claimed.

41 Claims, No Drawings

METHOD FOR PREPARING HIGH SOLIDS BENTONITE SLURRIES

This application is a continuation-in-part of U.S. application Ser. No. 07/631,919, filed Dec. 21, 1990, now U.S. Pat. No. 5,266,538.

FIELD OF THE INVENTION

This invention relates generally to smectite clays, and more specifically relates to a method for preparing a time-stable, low viscosity, high solids aqueous bentonite slurry which has good application properties upon dilution and use.

BACKGROUND OF THE INVENTION

Smectite clay is a commercially important mineral. With appropriate processing, smectite clays, both synthetic and from naturally occurring bentonites, find extensive application, e.g. as viscosifiers, binders, film formers, fabric softeners and retention aid additives in paper making. These clays are platey-type materials having a micaceous structure. They are highly colloidal and readily swell in water to form viscous, thixotropic gels which renders these clays useful as viscosity builders in the foregoing and in many additional industries and applications, including, for example, in foundry molding compositions, as suspension aids in agricultural sprays, and for thickening cosmetics and personal care products.

Most smectite clays are manufactured and sold as fine powders. As with most minerals, however, these powders are difficult and expensive to handle. They also are subject to considerable "dusting", i.e. evolution of dust during handling, so that they can, in some cases, cause environmental problems, and even health risks. To minimize these problems, many minerals are sold by the manufacturer as high solids aqueous slurries. Such high solids slurries can be easily stored, shipped, transferred, e.g. pumped and metered, with significantly less capital expenditures and many fewer problems than are associated with powdered minerals, as mentioned above.

In most applications, nevertheless, it is not economical to ship smectite clay slurries because of the large quantity of water present in shippable slurries. Since smectites are indeed good viscosifiers, it has not heretofore been practical to produce and ship high solids slurries by the usual methods. In general, only about 8%–10% solids slurries of good quality swelling smectite can be produced in water. Indeed, at solids contents greater than about 8%, the viscosities of the slurries can become so high that they cannot readily be pumped by conventional equipment and gelling upon standing becomes a problem. At higher solids it becomes virtually impossible to form a uniform paste without special equipment.

Thus, there is a need for slurries containing substantially greater than 8% by weight of smectite clay, which have viscosities low enough to allow pumping. In addition, the more such clay which can be incorporated into the slurry the more economical it is to ship the clay since the total weight of the slurry will include less water weight.

Van Fisk, U.S. Pat. No. 4,359,339 proposes the addition of a water soluble aluminum salt, such as aluminum sulfate, to permit the making of pumpable aqueous slurries of bentonite of up to 26% by weight of clay, primarily for use in making foundry sand compositions used in the making of molds. While apparently suitable for the purpose disclosed, aluminum salts have not been found to be satisfactory for making clay slurries of higher solids content, which are frequently desired for many purposes, especially when shipping is involved. Van Fisk also points out that certain other ions, such as calcium ion have been known to depress the gelling properties of bentonites in aqueous slurries, but that the properties are not readily reversible upon later dilution, thus limiting the value of such use. While aluminum ion appears to be less subject to this objection, to a considerable extent it suffers from the same problem. All multivalent cations tend to strongly bind the clay platelets together, which prevents dispersion and inhibits performance in applications where good dispersion is needed (viscosifiers, fabric softeners, retention aids).

In copending application Ser. No. 631,919, filed Dec. 21, 1990, for which I am co-inventor, and the disclosure of which is hereby incorporated by reference, it is disclosed that a smectite clay, such as a bentonite clay, may be provided as an elevated solids aqueous slurry e.g. up to 50% solids, by slurrying the smectite clay in an aqueous medium wherein the aqueous medium has an effective concentration of a salt having a monovalent cation. When such a salt is present in the clay slurry, the clay does not swell appreciably, is essentially inactive, and the slurry can be shipped, pumped and stored without creating a gelling problem. When this slurry is diluted with fresh water at the point of application to make it of the desired solids content for use, e.g. even to less than 1% solids, the smectite clay exhibits all of the desired properties, such as fabric softening, retention, etc. in most applications.

In a preferable procedure pursuant to the Ser. No. 631,919 application, a time-stable, low viscosity, high solids aqueous bentonite slurry is prepared by the steps of first preparing an aqueous solution of a monovalent salt; and thereupon dispersing in the solution at least 8% by weight of a powdered bentonite, by adding the powder to the solution with concurrent low shear mixing. The bentonite is preferably a sodium bentonite, which is added to the solution as from 8 to 50% by weight. The monovalent salt may comprise from about 1 to 35% by weight of the solution, and preferably comprises from 3 to 15%. The monovalent salt is preferably sodium chloride. The salt and clay can also be added to the aqueous phase at the same time. This gives a significant improvement over adding salt to a dispersed clay slurry but is not as effective as dissolving the salt first, and then adding the clay.

In the aforesaid Ser. No. 631,919 application it is also shown that potassium salts can be very effective in producing high solids bentonite slurries of desirably low viscosity. However, such salts are shown in our earlier disclosure to have an unacceptable negative effect on application properties of the said slurries. For example, in the Ser. No. 631,919 application, high solids slurries based upon different monovalent cations were diluted to 5% solids with salt-free water, sheared and viscosity measured. These slurries were then tested for their ability to improve water release from paper pulp slurries used in paper making. This technology is described in U.S. Pat. No. 4,305,781. In this test the shorter the "drainage" time (measured in seconds), the better. The optimum slurry would give low viscosity, low liquid separation and good flowability at high solids. Upon dilution for use in commercial applications, however, the optimum slurry would give high viscosity at 5% solids for rheological application and low drainage rate numbers for paper making applications. The data found in experiments of this type showed that potassium ion had a relatively detrimental effect when measured by such "application properties", thus apparently limiting its usefulness for such purposes.

Dispersant salts are routinely used to reduce the viscosity of various mineral slurries. However, when tetrasodium pyrophosphate, a common dispersant salt for minerals is used in applications such as the aforementioned, only moderately high solids slurries can be produced. Accordingly, in the 631,919 application it was concluded that the highest solids slurries which retained good application properties, were made with sodium chloride.

In accordance with the foregoing, it may be regarded as an object of the present invention, to provide a method for preparing a time-stable low viscosity, high solids aqueous smectite slurry, especially a bentonite slurry, which slurry when diluted for use in various applications such as paper making and the like, provides excellent application properties for such uses.

It is a further object of the invention to provide a method as aforementioned, wherein the bentonite in the resultant slurry, upon dilution with fresh water at the point of use, can be easily dispersed to generate the large surface area needed for maximum performance in many applications.

It is a still further object of the present invention to provide an improved smectite clay slurry of increased solids content, which remains pumpable and shippable without prohibitive gelling, even at the elevated solids content.

SUMMARY OF THE INVENTION

Now in accordance with the present invention, the foregoing objects and others as will become apparent in the course of the ensuing specification, are achieved in a method for preparing a time-stable, low viscosity, high solids aqueous bentonite slurry which has good application properties upon dilution and use. Pursuant to the method an aqueous solution of at least first and second salt components is prepared in which there is dispersed at least 8% by weight of a powdered bentonite, by intermixing of the powder with the solution. The first salt component is selected to give (if used alone) an acceptably low viscosity to said slurry at the high solids, and at least good application properties upon the dilution and use.

The second salt component is selected to act in combination with the first salt component to substantially further decrease the acceptably low viscosity at a specified high solids content or to enable increase of the solids content, while still maintaining the acceptably low viscosity, and not substantially impairing the application properties. The first salt component is selected from one or more members of the group consisting of sodium and lithium salts; and the second salt component is selected from the group consisting of potassium salts and dispersant salts having a monovalent cation. The sodium salts in the group for the first salt component are preferably sodium chloride, sodium carbonate, sodium nitrate, sodium citrate, sodium sulfate, sodium acetate and trisodium phosphate. Among the suitable lithium salts is lithium chloride. The potassium salts in the group for the second salt component are potassium chloride, potassium carbonate, potassium acetate and tripotassium phosphate; the dispersant salts are sodium silicate and tetrasodium pyrophosphate, and low molecular weight (less than 5,000) sodium polyacrylate.

By "acceptably low viscosity" is meant that the slurry including the at least 8% bentonite is pumpable from a container such as a shipping tank in which it may be transported. By "good application properties" is meant that when the high solids slurry is diluted e.g. to a representative level of 5% solids, it has high viscosity for rheological applications. The viscosity is sufficient to prevent the clay floccs from settling into the body of the liquid. Further, when used as a retention aid in papermaking, the diluted slurry enables high drainage rates and rapid drying of the paper stock.

In intermixing the bentonite powder with the aqueous solution of salt components, it is preferred to use low shear and low total energy. The degree of shear and total energy input used should be sufficient to provide a homogeneous blend of the clay aggregates and water, with minimum breakdown of the clay.

The aqueous solution is preferably prepared as an initial step, and the bentonite powder is then added to the solution with concurrent low shear mixing. Alternatively, preparation of the aqueous salt solution and the dispersion of said bentonite can be carried out as substantially simultaneous steps. The powdered bentonite dispersed in the aqueous solution can be a calcium bentonite; but preferably is a sodium bentonite, which is added to the solution as from 8 to 50% by weight (of the resulting slurry), and preferably is added in the range of from 15 to 40% by weight.

A preferable salt for the first salt component is sodium chloride, which comprises 5 to 35% by weight of the slurry. The first salt component can also be sodium carbonate, which comprises 5 to 25% of the slurry.

The second salt component, where a dispersant salt, is preferably sodium silicate, which is present as from 0.01 to 1.5% by weight of the slurry. The second salt component may also comprise a potassium salt as 1 to 3% by weight of the slurry, which can be combined with 0 to 1.5% by weight of sodium silicate.

In a further aspect of the invention, a method is disclosed for shipping a bentonite from a manufacturing point to a utilization point, and providing at the utilization point an aqueous swelled bentonite slurry. At the manufacturing point a high solids, low viscosity slurry comprising an aqueous solution of at least first and second salt components is prepared in which is dispersed at least 8% by weight of a powdered bentonite. The first and second salt components are prepared as previously discussed. The slurry is shipped to the utilization point; and is activated and swelled by diluting the high solids slurry with fresh water.

In a still further aspect of the invention, a high solids, low viscosity, pumpable slurry is provided, comprising an aqueous solution of at least first and second salt components in which is dispersed at least 8% by weight of a powdered smectite, wherein the first and second salt components are as previously discussed. Such a slurry can be shipped to a utilization point, and activated and swelled by diluting the high solids slurry with fresh water. It is also possible in some uses for the slurry to have acceptable properties even without such dilution.

DESCRIPTION OF PREFERRED EMBODIMENTS

The invention is further illustrated by the following Examples, which are to be considered representative and not delimitative of the invention which is otherwise set forth:

Procedure for Determining Drainage Characteristics

A laboratory procedure is utilized in the present invention to evaluate drainage properties of a starting high solids slurry when used as a retention aid, thereby simulating the filtration of wood pulp in a paper plant. In this procedure the high solids slurry is diluted from e.g. 30% clay solids to 5% and then to 1% with fresh water and mixed with paper pulp and a flocculant polymer (e.g. a cationic polyacrylamide). Typically a 0.1% polymer solution is added to 900 ml of the pulp at a 0.0039 volume ratio to the pulp, then the 1% clay solids slurry is added to the pulp at a volume ratio to the pulp of 0.0076. The mixture is poured into a Freeness tester having a special screen of approximately 40×60 mesh, and the rate of water flow is determined by measuring the time in seconds for 700 ml of filtrate to accumulate.

Procedures for Intermixing Clay with Salts Solution

As has been indicated it is preferred in preparing the high solids (at least 8% clay) slurries of the invention, to first prepare the aqueous solution containing the salt components and then add the smectite clay as a powder to the solution with low shear mixing. In order to achieve the desirable low shear on a commercial scale, various instrumentalities can be used, including paddle mixers, and turbine mixers such as a Lightnin Mixer which is operated at low speed—such as 100–120 rpm. In a typical plant scale procedure a Lightnin Mixer was used which had a 52 inch diameter rotor with four 45° blades. This mixer was mounted for rotation in an 8 foot diameter tank which was filled with 1890 gallons of water to which salts were added as 6.7% by weight of the resulting solution. There was then added concurrently with mixing a powdered bentonite (to yield 25% by weight of the total slurry). The top of the Lightnin mixer was submerged approximately 1.5 feet below the surface of the slurry and was rotated at 100 rpm by a 10 HP motor. The motor had an approximately 30% efficiency, whereby about 3 HP was dissipated into the slurry for a mixing period of 1 hour. The rotating blades produced a vortex at the surface of the slurry, into which the powdered bentonite was dispersed. This caused the powder to descend into the vortex, with the slurry circulation proceeding downwardly at the tank axis and then upwardly in the space between the blade tips and the container wall. Final volume of the resulting slurry was about 2250 gallons, of which about 5% by weight was the added salts. In effecting the intermixing, not only was the shear produced by the low rotational rate very low, but the total energy dissipated (i.e. 3 HP-hr) was also very low in relation to the total solids present. (The final slurry included about 2.8 tons of clay, whereby work input was somewhat over 1 HP-hr/ton solids.) In plant scale trials of this type the said Lightnin Mixer was used, at rotational rates of 100–120 rpm, dissipating about 3 HP for periods ranging from 0.75 to 1.5 hours, with work input ranging from about 1 to 2 HP-hr/ton solids. In the Examples that follow, procedures of the same general type were carried out, but on a laboratory scale using a laboratory Lightnin Mixer with a 15/16″ rotor. An initial volume of 300 ml of water was provided in a beaker and following salt(s) addition the clay was added with 2 to 3 minutes of mixing at 300 rpm. In all instances work input was less than the 1–2 HP-hr/ton solids discussed for the plant scale mixing.

Example 1 (Control)

This Example repeats the findings of Example 3 in the aforesaid Ser. No. 631,919 application. In the procedure used, a sodium bentonite in powder form is added to an aqueous solution of a designated salt to provide slurries of various bentonite solids content. Each slurry was mixed in a Lightnin mixer for 15 minutes.

Slurries containing 25% smectite with either 10% or 20% (based on clay weight) salt were made by this procedure. Several different salts were used. After the slurries were prepared, viscosities were measured with a Brookfield viscometer at 20 RPM. After 24 hours, a clear upper liquid layer formed in some of the slurries. The depth of this layer was measured and reported in millimeters. The slurries were also tested at this time for flowability. In this test the jar containing the slurry was turned on its side. If the slurry flowed out of the jar it was rated "OK". If the slurry did not flow it was rated "Gel".

After the flowability test, each slurry was diluted to 5% solids with salt free water and sheared in a Waring blender for 15 minutes. The 20 RPM Brookfield viscosity was again recorded. These slurries were then tested for their ability to improve water release from paper pulp slurries used in paper making. This technology is described in U.S. Pat. No. 4,305,781. In this test, the shorter the drainage time (in seconds) the better.

The results of these experiments are given in Table 1. The optimum slurry would give low viscosity, low liquid separation and good flowability at high solids. Upon dilution for use in commercial applications, the optimum slurry would give high viscosity at 5% solids for rheological application and low drainage times (in seconds) for paper making applications.

It can be seen from this data that, overall, the monovalent cations tend to be better than calcium and that sodium is better than Li or K. Multivalent cations such as calcium are good at producing the initial high solids slurries, but they also interfere with many of the application properties of smectites. Lithium performs fairly well but is a potential health hazard. Potassium, although monovalent, happens to be of the specific size to complex strongly with the surface of many smectites. This complexation is detrimental to many of the commercial applications of smectites. Overall, this prior data indicates that the preferred salt is sodium chloride. In applications where the chloride ion is a problem, such as corrosion sensitive systems, one of the other salts could be chosen.

TABLE 1

| SALT | % SALT[1] | 25% CLAY SLURRIES | | | 5% SOLIDS VISCOSITY[2] | DRAINAGE TIME |
| --- | --- | --- | --- | --- | --- | --- |
| | | 20 RPM BKFD. (CPS) | SEPARATION (mm) | FLOW 24 HR. | | |
| CaCl$_2$ | 10 | 950 | 4 | OK | — | — |
| | 20 | 700 | 5 | OK | 25 | 74 |
| K$_2$CO$_3$ | 10 | 490 | 8 | OK | — | — |
| | 20 | 230 | 14 | OK | 10 | — |

TABLE 1-continued

| | | 25% CLAY SLURRIES | | | | |
|---|---|---|---|---|---|---|
| SALT | % SALT[1] | 20 RPM BKFD. (CPS) | SEPARATION (mm) | FLOW 24 HR. | 5% SOLIDS VISCOSITY[2] | DRAINAGE TIME |
| KCl | 10 | 230 | 13 | OK | — | — |
| | 20 | 120 | 15 | OK | 5 | 62 |
| LiCl | 10 | 13250 | 0 | Gel | — | — |
| | 20 | 410 | 8 | OK | 1950 | 47 |
| Na2CO3 | 10 | 20500 | 0 | Gel | — | — |
| | 20 | 5200 | 0 | Gel | — | — |
| Na2SO4 | 10 | 4750 | 0 | Gel | — | — |
| | 20 | 4750 | 0 | Gel | — | — |
| Na Citrate | 10 | 40000 | 0 | Gel | — | — |
| | 20 | 5500 | 0 | Gel | 140 | 47 |
| NaCl | 10 | 2800 | 0 | OK | — | — |
| | 20 | 425 | 8 | OK | 1225 | 48 |
| NaNO3 | 10 | 14000 | 0 | OK | — | — |
| | 20 | 1700 | 2 | Gel | 1350 | 47 |
| Control | 0 | NA | NA | NA | 125 | 48 |

[1]Based on dry weight of clay used.
[2]20 RPM Brookfield after dilution and shearing in Waring Blender. Control made directly to 5% (cps).

Example 2 (Control)

This Example repeats the findings of Example 4 of the Ser. No. 631,919 application. Slurries were thus made in the same manner as in Example 1, except the clay solids were increased to 30% and the salts were added at 20% of the weight of the smectite clay. The data on these high solids slurries are given in Table 2.

TABLE 2

| | | 30% CLAY SLURRIES | | |
|---|---|---|---|---|
| SALT | % SALT[1] | 20 RPM BKFD. (CPS) | SEPARATION mm | FLOW 24 HR. |
| CaCl2 | 20 | 4,400 | 0 | OK |
| K2CO3 | 20 | 1,110 | 7 | OK |
| KCl | 20 | 490 | 12 | OK |
| NaCl | 20 | 2,800 | 3 | OK |

[1]Based on dry weight of clay used.

Example 3 (Control)

This Example repeats the findings of Example 5 in the Ser. No. 631,919 application. Dispersants are often used to reduce the viscosity of smectite slurries. Table 3 compares the effect of a dispersant on the viscosity of a smectite slurry, as a function of smectite solids in the slurry and the order of addition of the dispersant. In this study tetrasodium pyrophosphate was used as the dispersant.

Without any dispersant, the maximum obtainable solids is between 13 and 15%. When dispersant and clay are added together, the solids can be increased to somewhat less than 20%. When the dispersant is fully dispersed in the water first, solids in excess of 20% can be achieved. Even though the maximum achievable solids can be increased with a dispersant, the effectiveness is much inferior to the previous examples. This is true even when a sodium containing dispersant is used and is added to the water prior to the smectite. This is because the dispersant end of the molecule, in this case the pyrophosphate, tends to disperse loose aggregates of smectite even when the intercrystalline region cannot swell. This leads to an increase in viscosity of the slurry relative to other salts.

TABLE 3

| | Viscosity, 20 r.p.m. Brookfield (cps). | | |
|---|---|---|---|
| % SOLIDS | A | B | C |
| 5.0 | 125 | — | — |
| 7.5 | 1025 | 25 | 25 |
| 10.0 | 4400 | 100 | 75 |
| 13.2 | 15000 | — | — |
| 15.0 | Too Thick | 2950 | 1650 |
| 16.0 | — | 4000 | 2500 |
| 17.5 | — | 10000 | 4000 |
| 20.0 | — | Too Thick | 9750 |

A - No TSPP addition
B - 10% TSPP added to clay
C - 10% TSPP added to water

Example 4

In this Example, a further dispersant sodium salt, viz. sodium silicate, were evaluated by a procedure as in Example 3. More specifically, the viscosity properties of a 25% solids sodium bentonite slurry were evaluated utilizing quantities of sodium silicate ranging from 0.125% to 2.0% (by weight of the slurry). The resulting data appears in Table 4, and confirms the earlier conclusion that such dispersant salts are not very effective in producing high solids smectite slurries. Sodium silicate, like tetrasodium pyrophosphate is a dispersant commonly used to reduce viscosity of mineral slurries.

TABLE 4

| 25% CLAY SOLIDS SLURRY WITH SCAN OF Na2SiO3 | | | | | | | |
|---|---|---|---|---|---|---|---|
| | FORMULATION | | % Na2SiO3 | VISCOSITY, cps | | | |
| | | | | INITIAL | | 3 HOURS | |
| Dry CLAY | Na2SiO3* | H2O | ON CLAY | 20 | 50 | 20 | 50 rpm |
| 25 | 0.125 | 74.9 | 0.5 | 178,000 | 79,600 | off scale | off scale |
| 25 | 0.25 | 74.8 | 1.0 | 190,000 | off scale | off scale | off scale |
| 25 | 0.375 | 74.6 | 1.5 | off scale | off scale | off scale | off scale |
| 25 | 0.5 | 74.5 | 2.0 | 145,000 | 66,400 | 198,000 | 77,600 |
| 25 | 1.0 | 74.0 | 4.0 | 112,000 | 52,000 | 106,000 | 43,200 |
| 25 | 1.5 | 73.5 | 6.0 | 70,000 | 31,200 | 68,000 | 28,000 |

TABLE 4-continued

25% CLAY SOLIDS SLURRY WITH SCAN OF Na2SiO3

| Dry CLAY | FORMULATION Na2SiO3* | H2O | % Na2SiO3 ON CLAY | VISCOSITY, cps | | | |
|---|---|---|---|---|---|---|---|
| | | | | INITIAL | | 3 HOURS | |
| | | | | 20 | 50 | 20 | 50 rpm |
| 25 | 2.0 | 73.0 | 8.0 | 68,000 | 30,400 | 136,000 | 55,600 |

*2.30 ratio SiO2/Na2O

Example 5

The procedure of Example 4 was repeated, using a 10% solids sodium bentonite slurry, and varying the sodium silicate content from 0 to 1.00%. In addition to measuring viscosities as a function of time in the 10% bentonite slurry, drainage properties were evaluated by the procedure described in Example 1 (i.e. for a slurry diluted to 5% solids). The resulting data appears in Table 5. This shows that at 10% clay solids sodium silicate does produce acceptable viscosities; but at the expense of application properties. Accordingly, one would not expect sodium silicate to be commercially useful in the production of high solids smectite slurries, e.g. of a powdered bentonite.

TABLE 5

10% CLAY SOLIDS SLURRY WITH SCAN OF Na2SiO3

| Dry CLAY | FORMULATION (%) Na2SiO3* | H2O | % Na2SiO3 ON CLAY | VISCOSITY, cps 3 HOURS | | APPLICATION PROPERTIES DRAINAGE (sec.) |
|---|---|---|---|---|---|---|
| | | | | 20 | 50 | |
| 10 | 0 | 90 | 0 | 2700 | 1000 | 34.9 |
| 10 | 0.05 | 89.95 | 0.5 | 1800 | 880 | |
| 10 | 0.08 | 89.93 | 0.75 | 1450 | 780 | |
| 10 | 0.10 | 89.90 | 1.0 | 1150 | 600 | 36.3 |
| 10 | 0.20 | 89.80 | 2.0 | 825 | 430 | 34.6 |
| 10 | 0.40 | 89.60 | 4.0 | 785 | 330 | 36.3 |
| 10 | 0.60 | 89.40 | 6.0 | 325 | 200 | 36.5 |
| 10 | 0.80 | 89.20 | 8.0 | 320 | 180 | 37.3 |
| 10 | 1.00 | 89.00 | 10.0 | 280 | 156 | 38.0 |

*2.30 ratio SiO2/Na2O

Example 6

In this Example a 35% solids sodium bentonite slurry was prepared by addition of the powdered bentonite to a previously prepared solution of sodium chloride. The first portion of the data set forth in Table 6 shows the high solids viscosity for additional levels of sodium chloride ranging from 5% to 25% by weight of the slurry. Application properties are evaluated by measuring drainage where the slurry has been diluted with fresh water to 5% solids. In the second portion of the Table, the procedure is repeated, except that 0.35% by weight of sodium silicate is present with the sodium chloride. It will be seen that significant reductions in the minimum viscosity is achieved with little or no reduction in application properties.

TABLE 6

35%* CLAY SOLIDS SLURRY WITH A SCAN OF NaCl WITH & WITHOUT 0.35% Na2SiO3 IN SLURRY

| BD CLAY | FORMULATION (%) NaCl | Na2SiO3 | H2O | VISCOSITY, cps 3 HOURS | | APPLICATION PROPERTIES DRAINAGE (sec.) |
|---|---|---|---|---|---|---|
| | | | | 20 | 50 | |
| 35 | 5 | 0 | 60 | 7500 | 4300 | 24.1 |
| 35 | 10 | 0 | 55 | 5750 | 2300 | |
| 35 | 15 | 0 | 50 | 7000 | 3100 | 24.7 |
| 35 | 20 | 0 | 45 | 12000 | 5100 | |
| 35 | 25 | 0 | 40 | 33000 | 20000 | 23.3 |
| 35 | 5 | 0.35 | 59.65 | 6000 | 2000 | |
| 35 | 10 | 0.35 | 54.65 | 3250 | 1800 | 26.7 |
| 35 | 15 | 0.35 | 49.65 | 5250 | 2700 | |
| 35 | 20 | 0.35 | 44.65 | 9500 | 6700 | 26.5 |
| 35 | 25 | 0.35 | 39.65 | 50000 | 15200 | |

*1% Na2SiO3 on clay basis; 2.38 ratio SiO2/Na2O

Example 7

A procedure similar to Example 6 was used, based, however, on formation of a 25% solids sodium bentonite slurry, with a scan of sodium carbonate (5 to 25% by weight of slurry), with and without addition of 0.25% by weight of sodium silicate. The resulting data appears in Table 7, and shows similar benefits from the combination of small quantities of sodium silicate with sodium carbonate as are achieved by the combination of sodium silicate with sodium chloride.

TABLE 7

25% CLAY SOLIDS SLURRY WITH SCAN OF Na2CO3 WITH AND WITHOUT Na2SiO3 IN SLURRY

| Dry CLAY | FORMULATION (%) Na2CO3 | Na2SiO3 | H2O | VISCOSITY, cps 3 HOURS | | APPLICATION PROPERTIES DRAINAGE (sec.) |
|---|---|---|---|---|---|---|
| | | | | 20 | 50 | |
| 25 | 5 | 0 | 70 | 6250 | 2200 | 32.0 |
| 25 | 10 | 0 | 65 | 1200 | 560 | 33.9 |
| 25 | 15 | 0 | 60 | 1900 | 880 | |
| 25 | 20 | 0 | 55 | 2800 | 1320 | 37.8 |
| 25 | 25 | 0 | 50 | 17000 | 10000 | 35.6 |
| 25 | 5 | 0.25 | 69.75 | 2300 | 840 | 37.5 |
| 25 | 10 | 0.25 | 67.75 | 950 | 480 | 36.6 |
| 25 | 15 | 0.25 | 59.75 | 1200 | 640 | |
| 25 | 20 | 0.25 | 54.75 | 2150 | 1140 | 33.3 |
| 25 | 25 | 0.25 | 49.75 | 17250 | 14300 | |

*1% Na2SiO3 on clay basis; 2.38 ratio SiO2/Na2O

Example 8

As shown in control Examples 1 and 2, potassium salts when used alone can be deleterious to application properties. In this Example, however, potassium salts are used beneficially in combination with sodium salts. Thus in Section A of Table 8, the viscosity properties of a further 25% solids sodium bentonite slurry are shown for several addition levels of sodium chloride. Application properties are also given where the 25% solids slurry is diluted to 5% with deionized water. The application properties include Brookfield viscosity after 3 hours using a 20 and a 50 r.p.m. spindle; % water separation—see Example 1 for discussion of technique; and drainage. It is seen that the viscosity of the high solids slurry drops with increasing sodium chloride content. However, in some instances, high salt levels are not acceptable. As shown in the data of Section B of table 8, the use of potassium chloride/sodium chloride blends substantially reduces the high solids viscosity while maintaining the total salt content at 5%. The viscosity can be even further reduced without increasing the total percentage of salt by substituting small quantities of sodium silicate. This data appears in Section C of Table 8. Provided that the potassium chloride and sodium silicate levels do not get too high (respectively being in a preferable range of 1–3% and 0.25–1.5%), the high solids viscosity reductions are attained with little or no loss in application properties.

TABLE 9

BOTH CALCIUM AND SODIUM BENTONITES PERFORM EQUALLY AS WELL IN RETENTION AID APPLICATIONS WHEN 30% CLAY SOLIDS IS DISPERSED IN NaCl SALT SOLUTION

| | FORMULATION (%) | | | VISCOSITY, cps 3 HR | | APPLICATION PROPERTIES DRAINAGE |
|---|---|---|---|---|---|---|
| | CLAY | NaCl | H2O | 20 | 50 | (sec.) |
| Sodium Clay[1] | 30.0 | 6.38 | 63.62 | 2350 | 940 | 34.1 |
| Calcium Clay | 30.0 | 6.38 | 63.62 | 4350 | 1600 | 31.9 |
| Dry Sodium Clay[1] | | | | | | 32.7 |
| Dry Calcium Clay | | | | | | 43.3 |

[1]Sodium clay was formed from calcium clay with 4% soda ash addition

TABLE 8

COMBINATION SALTS WITH NaCl PRODUCES A LOWER VISCOSITY IN CONCENTRATED SLURRY THAN FOR NaCl ALONE ON THE SAME WEIGHT BASIS

| | FORMULATION (%) | | | | VISCOSITY, cps** 3 HR | | | APPLICATION PROPERTIES | | | | |
|---|---|---|---|---|---|---|---|---|---|---|---|---|
| | | | | | | | | VISCOSITY, cps* 3 HR | | % H2O SEPARATION | | DRAINAGE |
| Dry CLAY | NaCl | KCl | Na2SiO3 | H2O | 20 | 50 | pH | 20 | 50 | 25%, CS | 5% CS | (sec.) |
| Section A | | | | | | | | | | | | |
| 25 | 5 | 0 | 0 | 70 | 20000 | 7500 | 7.6 | 1125 | 480 | 0 | 0 | 22.7 |
| 25 | 7 | 0 | 0 | 68 | 10800 | 4320 | 7.4 | 925 | 380 | 0 | 0 | |
| 25 | 9 | 0 | 0 | 66 | 10400 | 3920 | 7.3 | 675 | 280 | 1 | 0 | |
| 25 | 11 | 0 | 0 | 64 | 8600 | 2840 | 7.2 | 275 | 110 | 1 | 2 | 23.9 |
| Section B | | | | | | | | | | | | |
| 25 | 5 | 0 | 0 | 70 | 20000 | 7500 | 7.6 | 1125 | 480 | 0 | 0 | 22.7 |
| 25 | 4 | 1 | 0 | 70 | 15000 | 5400 | 7.6 | 640 | 284 | 1 | 0 | 22.2 |
| 25 | 3 | 2 | 0 | 70 | 13000 | 5100 | 7.6 | 420 | 188 | 1 | 0 | 23.6 |
| 25 | 2 | 3 | 0 | 70 | 8750 | 3000 | 7.6 | 260 | 116 | 2 | 0 | 27.2 |
| Section C | | | | | | | | | | | | |
| 25 | 4 | 1 | 0 | 70 | 15000 | 5400 | 7.6 | 640 | 284 | 1 | 0 | 22.2 |
| 25 | 3.75 | 1 | 0.25 | 70 | 6750 | 2600 | 7.9 | 325 | 150 | 1 | 0 | 25.1 |
| 25 | 3.50 | 1 | 0.50 | 70 | 6750 | 2400 | 8.6 | 170 | 104 | 2 | 0 | 35.1 |
| 25 | 3.0 | 1 | 1.0 | 70 | 3200 | 1120 | 9.8 | 90 | 48 | 2 | 78 | 37.4 |
| 25 | 2.5 | 1 | 1.5 | 70 | 3050 | 1260 | 10.6 | 80 | 38 | 2 | 65 | 38.9 |

*25% clay solids slurry diluted to 5% clay solids slurry
**Viscosity at 25% clay solids

Example 9

In a further aspect of the invention, it is found that calcium bentonites can be used as the feed clay without the usual sodium conversion process steps required to make calcium bentonites useful in many applications, such as drainage improvement in paper making, provided that sodium ion is present in the high solids slurry, e.g. by use of a sodium salt in the slurry. The data in Table 9 shows that calcium bentonite used in a drainage test is much more effective as a high solids slurry than as a powder. For the sodium bentonite, the effectiveness is the same for the high solids slurry as for the powder. This sodium clay was produced by treating the calcium clay in this Example with sodium carbonate. Thus, the base bentonite is the same in all four formulations. However, when the calcium bentonite is used in the high solids slurry, no previous activation with soda ash is necessary. The ion exchange takes place in the high solids slurry, thus eliminating a processing step and reducing cost. This is significant since by far most of the bentonite deposits outside of the Northwestern U.S. are of calcium form.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. A method for preparing a time-stable, low viscosity, high solids aqueous bentonite slurry which has effective application properties to enable use as a viscosifier or retention aid upon dilution and use; said method comprising:
   preparing an aqueous solution of at least first and second salt components in which there is dispersed at least 8% by weight of the resultant slurry of a powdered bentonite;
   said first salt component comprising at least 5% by weight of said solution and being selected to give if used alone a sufficiently low viscosity to said slurry at said high solids to enable pumpability, and at least effective application properties to enable use as a viscosifier or retention aid upon said dilution and use; and said second salt component being selected and being in an effective concentration to act in combination with said first salt component to further decrease the said acceptably low viscosity at said high solids content or to enable increase of the solids content while maintaining said low viscosity, while not impairing said application properties; said first salt component being selected from one or more members of the group consisting of sodium salts and lithium salts; and said second salt component being selected from one or more members of the group consisting of potassium salts and dispersant salts having a monovalent cation.

2. A method in accordance with claim 1, in which the powdered bentonite is dispersed by low shear intermixing of same with said solution.

3. A method in accordance with claim 1, wherein said sodium salts in the group for said first salt component are selected from the group consisting of sodium chloride, sodium carbonate, sodium nitrate, sodium citrate, sodium sulfate, sodium acetate and trisodium phosphate.

4. A method in accordance with claim 1, wherein said first salt component comprises lithium chloride.

5. A method in accordance with claim 3, wherein said potassium salts in the group for said second salt component are selected from the group consisting of potassium chloride, potassium carbonate, potassium acetate and tripotassium phosphate.

6. A method in accordance with claim 5, wherein said dispersant salts in the group for said second salt component are selected from the group consisting of sodium silicate and tetrasodium pyrophosphate, and low molecular weight sodium polyacrylate.

7. A method in accordance with claim 1, wherein said aqueous solution is prepared as an initial step, and said bentonite powder is then added to said solution with concurrent low shear mixing.

8. A method in accordance with claim 1, wherein said preparation of said aqueous salt solution and said dispersion of said bentonite are carried out as substantially simultaneous steps.

9. A method in accordance with claim 1, wherein the powdered bentonite dispersed in said aqueous solution is a calcium bentonite.

10. A method in accordance with claim 1, wherein the powdered bentonite dispersed in said aqueous solution is a sodium bentonite, which is added to said solution as from 8 to 50% by weight of the slurry.

11. A method in accordance with claim 10, wherein said sodium bentonite is added in the range of from 15 to 40% by weight.

12. A method in accordance with claim 10, wherein said first salt component is sodium chloride, and comprises 5 to 35% by weight of said slurry.

13. A method in accordance with claim 10, wherein said first salt component is sodium carbonate, and comprises 5 to 25% by weight of said slurry.

14. A method in accordance with claim 12, wherein said second salt component is sodium silicate, which is present as from 0.01 to 1.5% by weight of said slurry.

15. A method in accordance with claim 13, wherein said second salt component is sodium silicate, which is present as from 0.01 to 1.5% by weight of said slurry.

16. A method in accordance with claim 12, wherein said second salt component comprises sodium silicate which is present as 0 to 1.5% by weight, and said potassium salt as 1 to 3% by weight.

17. A method in accordance with claim 13, wherein said second salt component comprises sodium silicate which is present as 0 to 1.5% by weight, and said potassium salt as 1 to 3% by weight.

18. A method for shipping a bentonire from a manufacturing point to a utilization point, and providing at the utilization point an aqueous swelled bentonire slurry; comprising the steps of:

preparing at said manufacturing point a high solids, low viscosity slurry comprising an aqueous solution of at least first and second salt components in which is dispersed at least 8% by weight of the resultant slurry of a powdered bentonite;

said first salt component comprising at least 5% by weight of said solution and being selected to give if used alone a sufficiently low viscosity to said slurry at said high solids to enable pumpability, and at least effective application properties to enable use as a viscosifier or retention aid upon said dilution and use; and said second salt component being selected and being in an effective concentration to act in combination with said first salt component to further decrease the said acceptably low viscosity at said high solids content or to enable increase of the solids content while maintaining said low viscosity, while not impairing said application properties; said first salt component being selected from one or more members of the group consisting of sodium salts and lithium salts; and said second salt component being selected from one or more members of the group consisting of potassium salts and dispersant salts having a monovalent cation.

shipping said slurry to the said utilization point; and activating and swelling the bentonite at the utilization point by diluting the high solids slurry with fresh water.

19. A method in accordance with claim 18, wherein said sodium salts in the group for said first salt component are selected from the group consisting of sodium chloride, sodium carbonate, sodium nitrate, sodium citrate, sodium sulfate, sodium acetate and trisodium phosphate.

20. A method in accordance with claim 19, wherein said potassium salts in the group for said second salt component are selected from the group consisting of potassium chloride, potassium carbonate, potassium acetate and tripotassium phosphate.

21. A method in accordance with claim 20, wherein said dispersant salts in the group for said second salt component are selected from the group consisting of sodium silicate, tetrasodium pyrophosphate, and low molecular weight sodium polyacrylate.

22. A method in accordance with claim 18, wherein the powdered bentonite dispersed in said aqueous solution is a calcium bentonite.

23. A method in accordance with claim 22, wherein the powdered bentonite dispersed in said aqueous solution is a sodium bentonite, which is present in the high solids slurry as from 8 to 50% by weight.

24. A method in accordance with claim 23, wherein the dilution of the high solids slurry at the utilization point brings said clay solids to from 1 to less than 8% solids.

25. A method in accordance with claim 23, wherein said sodium bentonite is present in the range of from 15 to 40% by weight.

26. A method in accordance with claim 23, wherein said first salt component is sodium chloride in an amount of from 5 to 35% by weight of said aqueous slurry.

27. A method in accordance with claim 25, wherein said first salt component comprises sodium carbonate in an amount of from 5 to 25% by weight of said aqueous slurry.

28. A method in accordance with claim 27, wherein said second salt component comprises sodium silicate in an amount of from about 0 to 1.5%, and said potassium salt in an amount of from about 1.0 to 3.0% by weight of said aqueous slurry.

29. A method in accordance with claim 27, wherein said second salt component comprises 0.1 to 0.5% sodium silicate and 0 to 3% of said potassium salt, by weight of said aqueous slurry.

30. A method in accordance with claim 27, wherein said second salt component comprises 1.0 to 3.0% by weight of said potassium salt.

31. A method in accordance with claim 30, wherein said potassium salt is potassium chloride and/or potassium carbonate.

32. A method for preparing a time-stable, low viscosity, high solids aqueous smectite slurry which has effective application properties to enable use as a viscosifier or retention aid upon dilution and use; said method comprising:

preparing an aqueous solution of at least first and second salt components in which there is dispersed at least 8% by weight of the resultant slurry of a powdered smectite;

said first salt component comprising at least 5% by weight of said solution and being selected to give if used alone a sufficiently low viscosity to said slurry at said high solids to enable pumpability and at least effective application properties to enable use as a viscosifier or retention aid upon said dilution and use; and said second salt component being selected and being in an effective concentration to act in combination with said first salt component to further decrease the said acceptably low viscosity at said high solids content or to enable increase of the solids content while maintaining said low viscosity, while not impairing said application properties; said first salt component being selected from one or more members of the group consisting of sodium salts and lithium salts; and said second salt component being selected from one or more members of the group consisting of potassium salts and dispersant salts having a monovalent cation.

33. A method in accordance with claim 32, wherein said first salt component is selected from one or more members of the group consisting of sodium salts and lithium salt; and said second salt component is selected from one or more members of the group consisting of potassium salts and dispersant salts having a monovalent cation.

34. A method for preparing a time-stable low viscosity, high solids aqueous bentonite slurry which has good application properties upon dilution and use; said method comprising:

preparing an aqueous solution of a salt including a sodium cation in which there is dispersed at least 8% by weight of the resultant slurry of a powdered calcium bentonite, by low shear intermixing of said powder with said solution; and wherein said salt is selected from one or more members of the group consisting of sodium chloride and sodium carbonate.

35. A high solids, low viscosity pumpable smectite slurry, comprising an aqueous phase in which is dissolved from 5 to 25% by weight of said slurry of a first salt component selected from one or more members of the group consisting of sodium salts and lithium salts, and 0.01 to 3% by weight of said slurry of a second salt component selected from one or more members of the group consisting of potassium salts and dispersant salts having a monovalent cation, and in which there is dispersed at least 8% by weight of said slurry of a powdered smectite.

36. A slurry in accordance with claim 35, in which said first salt component is sodium chloride, and comprises 5 to 35% by weight of said slurry.

37. A slurry in accordance with claim 36, in which said first salt component is sodium carbonate, and comprises 5 to 25% by weight of said slurry.

38. A slurry in accordance with claim 35, in which said second salt component is sodium silicate, which is present as from 0.01 to 1.5% by weight of said slurry.

39. A slurry in accordance with claim 36, in which said second salt component is sodium silicate, which is present as from 0.01 to 1.5% by weight of said slurry.

40. A slurry in accordance with claim 35 in which said second salt component comprises sodium silicate which is present as 0 to 1.5% by weight, and said potassium salt as 1 to 3% by weight.

41. A slurry in accordance with claim 36, in which said second salt component comprises sodium silicate which is present as 0 to 1.5% by weight, and said potassium salt as 1 to 3% by weight.

* * * * *